United States Patent [19]

Hyppanen et al.

[11] Patent Number: 5,281,398
[45] Date of Patent: Jan. 25, 1994

[54] CENTRIFUGAL SEPARATOR

[75] Inventors: Timo Hyppanen; Reijo J. Kuivalainen, both of Karhula; Harry Ollila, Kauniainen, all of Finland

[73] Assignee: A. Ahlstrom Corporation, Karhula, Finland

[21] Appl. No.: 953,297

[22] Filed: Sep. 30, 1992

Related U.S. Application Data

[63] Continuation of Ser. No. 765,450, Sep. 25, 1991, abandoned.

[30] Foreign Application Priority Data

Oct. 15, 1990 [FI] Finland .................. 905070
Feb. 20, 1991 [FI] Finland .................. 910809

[51] Int. Cl.⁵ .......................................... F27B 15/08
[52] U.S. Cl. .................................. 422/147; 422/146; 55/269; 55/459.1; 55/346
[58] Field of Search ............... 422/146, 147; 55/269, 55/459.1, 346, 349

[56] References Cited

U.S. PATENT DOCUMENTS

| | | | |
|---|---|---|---|
| 479,231 | 7/1892 | Van Gelder | 55/459.1 |
| 522,769 | 7/1894 | Thompson | 55/459.1 |
| 638,983 | 12/1899 | Osborne | 55/459.1 X |
| 710,605 | 10/1902 | Osborne et al. | 55/459.1 X |
| 4,205,968 | 6/1980 | Hakala | 55/346 X |
| 4,285,142 | 8/1981 | Suzuki et al. | 34/57 |
| 4,483,692 | 11/1984 | Patel | 55/269 X |
| 4,615,715 | 10/1986 | Seshamani | 55/269 |
| 4,746,337 | 5/1988 | Magol et al. | 55/269 |
| 4,747,852 | 5/1988 | Engström | 422/147 |
| 4,778,660 | 10/1988 | Haddad et al. | 422/147 |
| 4,793,292 | 12/1988 | Engstrom et al. | 55/269 X |
| 4,820,427 | 4/1989 | Ryynanen | 210/788 |
| 4,913,711 | 4/1990 | Stewart | 55/269 |
| 4,915,061 | 4/1990 | Garcia-Mallol | 122/4 D |
| 4,957,520 | 9/1990 | Parmentier et al. | 55/269 |
| 4,961,761 | 10/1990 | Johnson | 55/269 |
| 5,095,854 | 3/1992 | Dietz | 122/4 D |

FOREIGN PATENT DOCUMENTS

| | | |
|---|---|---|
| 0205718 | 12/1986 | European Pat. Off. . |
| 679333 | 3/1939 | Fed. Rep. of Germany . |
| 676175 | 5/1939 | Fed. Rep. of Germany . |
| 3435214 | 4/1986 | Fed. Rep. of Germany . |
| 64058 | 6/1983 | Finland . |
| 979345 | 4/1951 | France . |
| WO87/05826 | 10/1987 | PCT Int'l Appl. . |
| 2108409 | 5/1983 | United Kingdom . |

OTHER PUBLICATIONS

"Pyroflow Compact: A Second Generation CFB Boiler by Ahlstrom Pyropower", Gamble et al., Fluidized Bed Combustion, vol. 2, ASME 1993, pp. 751-760.

Primary Examiner—Robert J. Warden
Assistant Examiner—Hien Tran
Attorney, Agent, or Firm—Nixon & Vanderhye

[57] ABSTRACT

A centrifugal separator for separating particles from gases is a vortex chamber composed of cooling planar plates or panels (i.e. they are distinctly non-cylindrical), having at least one gas inlet, at least one gas outlet and at least one outlet for the separated particles. The cross section of the side walls of the vortex chamber forms a distinctly non-circular gas space (e.g. a polygonal cross section), have a circularity of greater than 1, e.g. $\geq 1.1$, and preferably $\geq 1.15$. One or more vertical, parallel gas vortices may be created in the vortex chamber, the gas introduced into vertical narrow slots. The outlets for separated particles are not on the same symmetrical axes as the outlets for purified gas. Two adjacent vortices may be provided in a common rectangular chamber. The separator is preferably in conjunction with a circulating fluidized bed reactor.

24 Claims, 8 Drawing Sheets

CENTRIFUGAL SEPARATOR

This is a continuation of application Ser. No. 07/765,450, filed Sep. 25, 1991, now abandoned.

BACKGROUND OF THE INVENTION

The present invention relates to a centrifugal separator for separating particles from gases. The centrifugal separator comprises a vortex chamber, which is provided with at least one inlet for the gases to be purified, disposed in the upper section thereof, at least one outlet for the purified gases, disposed in the upper or lower section thereof, and at least one outlet for the separated particles, disposed in the lower section thereof. At least one vertical vortex is formed in the centrifugal separator.

Various cyclone separators are previously known, which comprise a cylindrical, vertical vortex chamber serving as a separating chamber and having the lower section thereof shaped as a downwardly tapering funnel. The upper section of the vortex chamber is provided with a tangential inlet duct for the gas flow to be treated. The purified gas is generally discharged through an opening disposed centrally at the upper end of the vortex chamber. In flow-through cyclones, the gas is discharged from the vortex chamber through a center pipe disposed in the bottom of the vortex chamber.

In the cyclone, solids are separated from the gases by centrifugal force and they flow along the wall of the separating chamber down to the tapered part of the separator, wherefrom they are discharged. In a conventional cyclone separator, separation is based on the mutual effect of centrifugal force and changes in the flow velocity. The gas flow entering a conventional cyclone starts to whirl spirally, mainly downwardly along the external wall of the vortex chamber, accelerating as the taper diameter becomes smaller. In the lower section of the cyclone, the gases change their direction of movement and start to flow upwardly in the center of the vortex chamber towards the upper section of the separator, which is provided with a gas outlet duct. The solid material concentrated on the walls of the lower section of the vortex chamber by the effect of centrifugal force is not capable of following the gases, but it continues to flow downwardly into an outlet duct.

The cyclone walls are heavily worn especially by abrasive solids. The abrasive effect can be seen particularly in that part of the wall after the inlet which is first hit by the flow of solids. Attempts have been made to decrease the abrasion by protecting the inner surfaces of the vortex chamber by abrasion resistant refractories or by manufacturing the vortex chambers from abrasion resistant materials. High temperature adds to the abrasive effect of solid material.

A problem encountered with circulating fluidized bed reactors, which have become common in combustion and gasification processes, is separating solid particles entrained with hot gas and returning them to the reactor. Special demands placed on the centrifugal separator installed in such a situation are the capabilities to continuously separate great amounts of solids from gases and to endure exposure to erosion when large volumes of hot gases and solid particles flow through the separator.

The main disadvantage with the conventional cyclones in big reactors is that the cyclones have to be heat-insulated, e.g., with ceramic heat insulators for maintaining the outer surface of the separator relatively cold. For providing adequate heat insulation, a thick layer of insulation material is needed, which adds to the price, weight and space requirement of the separator. Furthermore, in order to endure hot conditions, the cyclones have to be internally protected with abrasion resistant layers of refractory. The cyclone walls are thereby covered by two layers of different materials. It is difficult and time consuming to apply these two layers on the walls especially as one of the layers is very thick and has to dry slowly. The two layers are also very susceptible to damage due to temperature differences, e.g. during start-up, and mechanical stress during operation of the system.

On the whole, the cyclone has become an apparatus with thick insulation layers susceptible to damage, which needs a very large space. Because it is a heavy structure, it also requires a strong support structure. This heavy structure means that start-up takes a long time in order to avoid cracks of ceramic parts or refractories. Temperature differences in refractory linings during start-up may cause cracks and, therefore, must be avoided.

The bed material circulating in circulating fluidized bed reactors may be extremely fine, for example, if fine lime is used for absorbing sulfur dioxide in the bed or if the fuel ash is fine. This sets high standards for the cyclone. Attempts have been made to improve the separation efficiency of the cyclone by connecting two or more cyclones in series. Drawbacks of such connections are great pressure losses, expensive structure, and connections requiring much space.

Cyclone batteries comprised of cyclones connected in parallel have also been suggested to achieve a better separating efficiency. The aim has been to achieve higher separation efficiencies by using smaller units. These cyclone batteries are, however, expensive and complicated to manufacture. The cyclone batteries require a certain minimum pressure difference for the gas to be always evenly distributed through the various cyclones.

The walls of the combustion reactors are usually made of water tube panels for partial recovery of the heat generated in the reactor. The cyclone separators and return ducts for the solid material are usually uncooled, heat-insulated structures. Joining such cooled and uncooled parts together is difficult due to unequal heat expansion and thick insulation layers. Therefore, the connections between the reactor and the separator require expensive, ceramic or equivalent heat resistant ductworks and expansion joints. The cyclone separator and the convection section disposed thereafter also require special expansion joints.

When changing the diameter of the cross-section of a cyclone, the distance between adjacent water tubes on the cyclone wall is changed, unless some tubes are taken away or added to some parts of the cyclone wall. This is a complicated process.

For avoiding the above-mentioned drawbacks caused by heat expansion, for example, U.S. Pat. No. 4,746,337 suggests a cyclone of water tube structure. However, manufacturing a cylindrical cyclone of a tubular structure is not simple. Further, the tube panels have to be bent into very awkward shapes in the manufacturing stage, a time consuming and difficult process.

Finnish patent application 861224 discloses a cylindrical cyclone separator of water tube structure, one of the water tube walls being common to both a reaction chamber and a particle separator. As above, this arrangement also involves awkward bends.

U.S. Pat. No. 4,615,715 discloses a separator enclosure manufactured of tube panels and an actual vortex chamber manufactured of a cylindrical, abrasion resistant unit disposed inside the enclosure. The annular space between the separator enclosure and the cylindrical unit is filled with some suitable filler. Due to the cylindrical unit being disposed inside the separator and due to the filler, the separator is, however, large and heavy, although part of the heat insulator has been left out. Furthermore, the cylindrical inner part of the vortex chamber is worn by particles flowing downwards along the walls.

According to the invention, a separator apparatus is provided which is simpler in construction, less susceptible to damages, especially in its insulation layers, does not take up as much space, and is less expensive than conventional high temperature cyclone separators. The centrifugal separator of the invention may be manufactured of simple elements, e.g. mainly planar or plate-formed water tube panels. The separator of the invention is easily made modular. Due to its modular structure, the inventive separator is better applicable than the previously known structures to large circulating fluidized bed reactors, and is highly resistant to abrasion.

It is a characteristic feature of the centrifugal separator according to the invention that the vortex chamber is non-cylindrical, is mainly composed of planar walls, the cross section of the side walls of the vortex chamber preferably being in the shape of a square, rectangle, or other polygon. The cross section of the interior gas space, defined by the vortex chamber, is distinctly non-circular. By "gas space" in a vortex chamber is meant the inner space which can freely be filled up by gas. The gas space is substantially limited by the inner walls of the vortex chamber and by elements fitted on the wall (if there are any). The gas space is a space into which gas can flow freely without being restricted by any elements, refractory layers or the like.

The cross-sectional shape of the gas space of the vortex chamber may be illustrated by a circularity X, which is the circumference of the gas space divided by the circumference of the biggest circle contained in the cross section of the gas space. With a cylindrical separator, $X=1$, and with a square, $X=1.273$. In the separator according to the invention, the circularity X of the gas space of the separator is equal to or greater than 1, e.g. $X \geq 1.1$, and preferably X is equal to or greater than 1.15. While a separator with circularity of $X>1$ is known per se from German 3435214, such a structure is indicated as being unsuitable for use in separating out particles, and thus teaches away from the invention.

The inside of the vortex chamber of the separator of the invention is at least partially lined with a thin layer of abrasion and heat resistant refractory material. This layer of refractory does not substantially make the cross section of the gas space circular, but it protects areas susceptible to abrasion in the vortex chamber. Nor does the layer of refractory in a preferred embodiment of the invention substantially function as a heat insulator in a vortex chamber. The thickness of the layer of refractory is preferably only about 40 to 150 mm. This thin, abrasion and heat resistant layer of refractory may be attached with studs or other clamping elements to the wall surface of the vortex chamber, said wall surface being preferably a water tube panel. By attaching the layer of refractory directly to a cooled wall, without any insulator or other layers therebetween, cooling of the refractory is also made possible. When cooling, this layer of refractory becomes both chemically and mechanically more durable. Heat-conducting material may be selected as an abrasion resistant material. Such material cools still faster. The studs also enhance cooling. To lessen the abrasive effect of the particles suspended in the inlet gas, the wall opposite to the inlet wall and areas which are especially susceptible to abrasion may be provided with a specific, additional layer of protecting refractory material or with a refractory material which is more abrasion-resistant than the refractory in the rest of the chamber.

In a preferred embodiment of the invention, the walls of the vortex chamber are composed of cooling surfaces, such as water tube panels. Since the vortex chamber is preferably defined by planar walls, the wall elements may be planar or curved ready-made water tube panels. Thus, it is possible to simply assemble a centrifugal separator such as, e.g., a gasification or combustion reactor, by welding it in the intended place of operation. A portion or preferably all walls of the vortex chamber are of cooled structure. The cooling system of the vortex chamber is preferably connected to the main water/steam system of the fluidized bed reactor with which it is associated.

A cooled particle separator according to the present invention does not have to be lined by thick heat resistant refractory linings or other thick protective layers, which would easily be damaged due to temperature differences during start-up or during operation and, therefore, would easily break or crack [thick linings also consume much space]. According to the present invention, relatively thin abrasion resistant protective layers on the cooling panel are sufficient. According to the present invention, problems with thick linings, as well as other problems due to thermal expansions, can be avoided. Thermal expansions in both reactor chamber and separator can more easily be predicted and compensated when both are formed of water tube panels, where the temperature is more easily controlled. Basically, due to smaller or nonexistent differences in thermal expansion between the reactor chamber and separator according to the invention, problems with expansion joints between the separator and reactor chamber can be minimized.

In accordance with a preferred embodiment of the invention, the centrifugal separator is comprised of an elongated vortex chamber, wherein two or more parallel gas vortices are formed at a spaced relationship. The side walls of the vortex chamber consist of four planar panels, e.g., water tube panels, two opposite walls being the long walls and the remaining two the end walls of the vortex chamber. The long walls may preferably be two or more times longer than the end walls. In that case, the cross section of the inside space of the vortex chamber preferably corresponds to the space of two or more successive squares, the length of a side of the square equalling the length of the end wall. Preferably, the number of gas vortices is equal to the number of squares.

The elongated vortex chamber is provided with a plurality of successive vortices in the longitudinal direction of the chamber by disposing the gas inlet/inlets and the gas outlet/outlets suitably so that the number of vortices produced in the vortex chamber equals the number of the gas outlets therein. The gas outlet/outlets are so disposed in the vortex chamber as to enable the gas from the inlet to be directed tangentially into one or two parallel vortices.

The gas inlets are disposed in the side wall of the vortex chamber so as to guide the gas tangentially from the inlet into the gas vortices in the vortex chamber and maximize the "spin-effect" of the introduced gas jets corresponding to the centers of the gas outlet openings. The "spin-effect" - $m * v * r$, when $m=$mass flow, $v=$gas velocity and $r=$is the perpendicular distance between gas inlet jet and center of gas outlet opening. The gas vortices formed in the vortex chambers are substantially concentric with the gas outlet openings. It is also possible to guide gas from one inlet to two adjacent gas vortices or guide gas from two or more gas inlets to only one gas vortex.

The elongated vortex chamber is suitable to be disposed next to (in operative association with) a circulating fluidized bed reactor in such a manner that one of the reactor walls or at least part of the upper section of the wall serves as a wall of the vortex chamber. Thus, for example, part of a common long wall of the reactor may serve as a long wall of the vortex chamber, which naturally cuts down the material costs.

Furthermore, two other walls of the reactor may preferably be utilized in connecting the reactor and the separator. The extensions of the walls perpendicular to the common wall may constitute, e.g. the end walls of the vortex chamber. Thus, three cooled panel walls of the reactor may be utilized in the separator construction, which brings remarkable advantages economically and in view of manufacture. This structure enables arranging of, e.g. the combustion furnace of the fluidized bed reactor and the cyclone separator according to the invention so as to compose a single rectangular structure, which is most advantageous with respect to supporting of the structure.

An outlet for the separated solids may be provided corresponding to each gas vortex in the vortex chamber, so that an even distribution of returned solids into the reactor chamber is easy to arrange from several adjacent places, e.g., in a circulating fluidized bed reactor. The solids separated in different vortices may, on the other hand, be collected in one collection chamber or hopper disposed in the lower section of the vortex chamber and may be further conducted to a desired location in one or several particle flows.

In the elongated vortex chamber, the long walls may need support for stiffening the wall panels and for preventing the deflection thereof. In this case, transverse supports or transverse walls may be disposed between the two opposite long walls, for stiffening the chamber structure. The transverse supports/walls are disposed between two gas vortices so that the transverse supports/walls do not have a harmful effect on vortex formation. The transverse supports/walls may be cooled and/or manufactured from abrasion and heat resistant material. The transverse supports may constitute a partition wall in the vortex chamber so as to partly or completely divide the chamber into separate sections. The transverse supports may extend from the ceiling of the vortex chamber down to the bottom thereof, whereby two or, depending on the number of the transverse walls, more completely separate gas spaces are formed in the chamber. On the other hand, the transverse supports may only be short support elements which do not actually divide the chamber into separate gas spaces.

The gas inlets in the vortex chamber are preferably in the shape of vertical, narrow, elongated slots. The slots may be, e.g., as high as the upper section of the vortex chamber. The width of the slot is determined according to the cross-section required for gas flow may be preferably arranged with guide plates for guiding the gas tangentially into the vortex. The guide plates also serve as stiffeners of the long wall.

In centrifugal separators according to the invention only one gas vortex is formed if the separator has a square cross-section. It is easy to arrange a plurality of these parallel and, thereby construct a compact cyclone battery made of simple elements, and taking up little space.

The most significant advantages of the invention are its simple structure and the fact that both a reactor chamber and a small battery of particle separators may be constructed, e.g., of simple, planar parts, such as ready-made water tube panels, which may be manufactured in advance by an inexpensive welding method in a workshop. By arranging a plurality of gas vortices effecting separation of solids in one elongated vortex chamber space, less separator wall area is needed in comparison with a cyclone battery assembled of several independent separators.

Due to cooling, the wall structure of the separator is thinner than that of the conventional hot gas separators and, due to its square/rectangular shape, the separator may be manufactured of plate-formed parts.

A separator according to the invention is constructionally suitable for purifying product or flue gases, for example, in gasifiers and combustion reactors functioning on the fluidized bed principle, where it is desirable to have a cooled structure and where the amount of particles to be separated is great. The invention is especially suitable for separating circulating solids from gases in circulating fluidized bed reactors.

BRIEF DESCRIPTION OF THE DRAWINGS

FIGS. 5B-7B are views like those of FIGS. 5A-7A for slightly different embodiments;

FIG. 8 is a cross-sectional view of yet another embodiment of the centrifugal separator according to the invention;

DETAILED DESCRIPTION OF THE DRAWINGS

Figure 1:
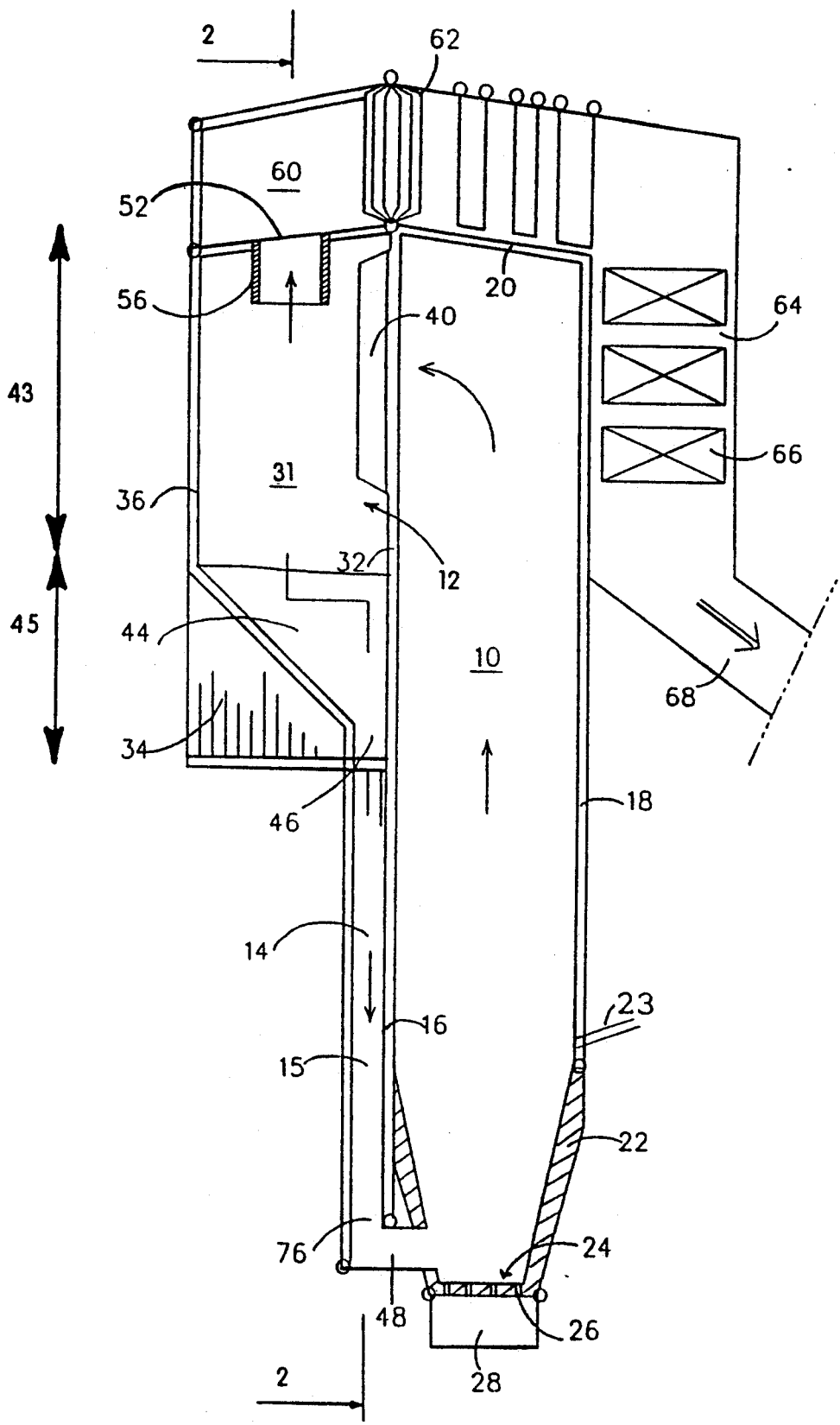
FIG. 1 is a schematic illustration of an exemplary centrifugal separator according to the invention disposed in operative association with a circulating fluidized bed reactor.
Figure 2:
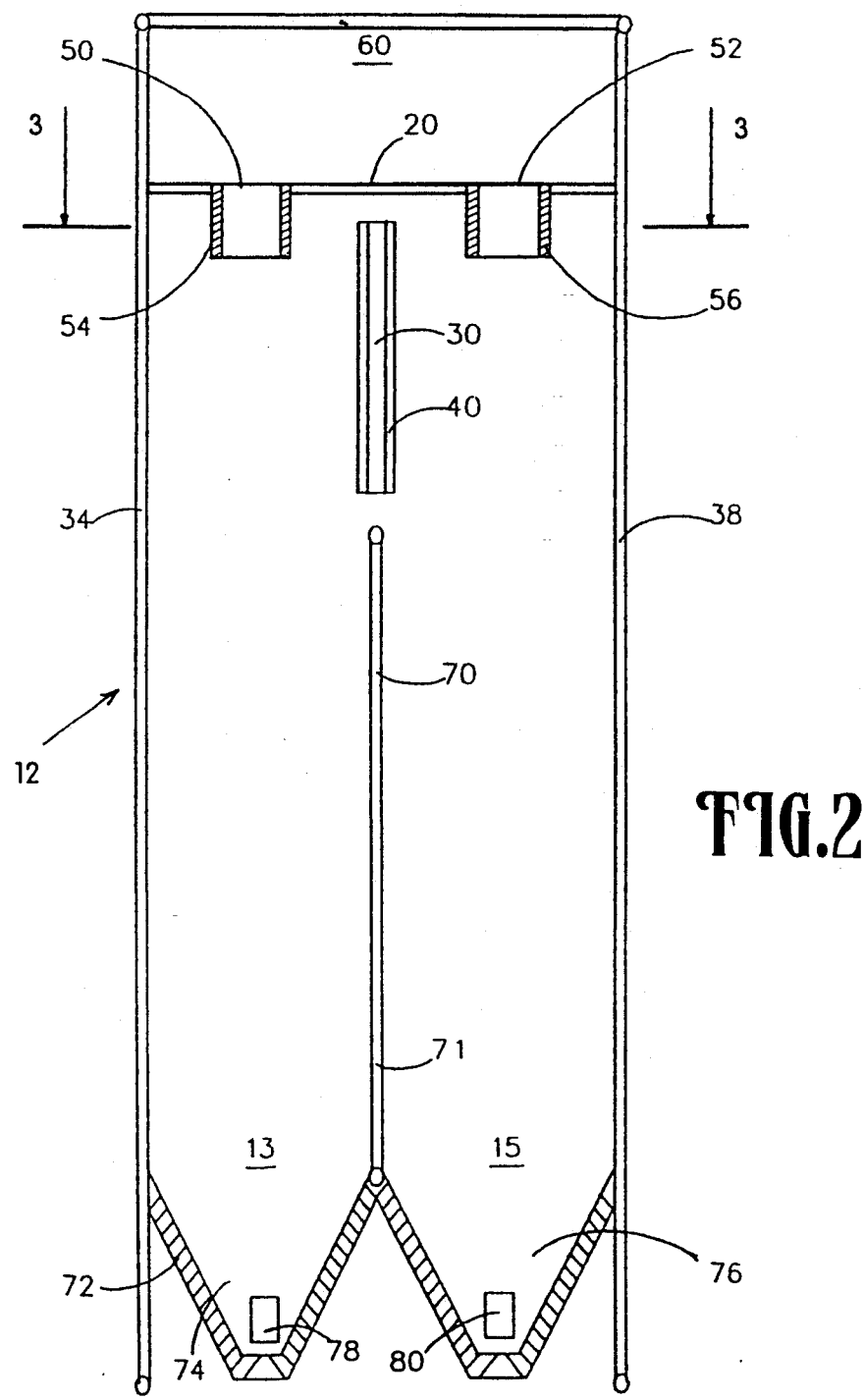
FIG. 2 is a sectional view of FIG. 1 taken along line 2—2 thereof.
Figure 3:
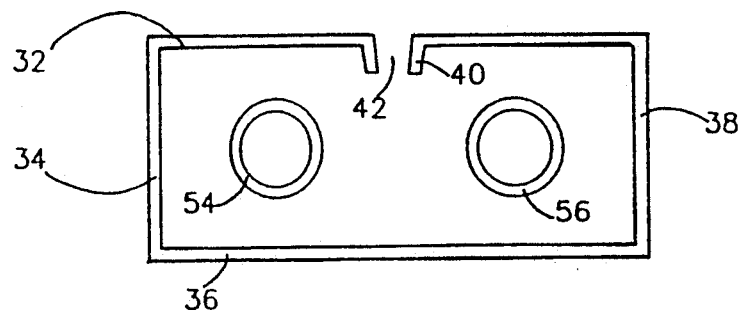
FIG. 3 is a sectional view of FIG. 2 taken along line 3—3 thereof.

FIGS. 1, 2 and 3 illustrate a circulating fluidized bed reactor comprising a reaction chamber 10, a centrifugal particle separator (cyclone) 12 and a return duct 14 for separated particles. The cross section of the reaction chamber is rectangular and the reaction chamber 10 is composed of water tube walls, only the long walls 16 and 18 of which are shown in FIG. 1. The water tube walls are preferably formed of joined vertical water tubes.

The upper part of wall 18 is bent to form the ceiling 20 of the reaction chamber 10. The walls of the lower section of the reaction chamber 10 are protected with refractory material 22. The reactor has an inlet 23 for solid material. The bottom of the reaction chamber 10 is formed of a distribution plate 24, which is equipped with nozzles or openings 26 for introducing fluidizing gas from an air plenum chamber 28 into the reaction chamber for maintaining a fluidized bed in the chamber. Fluidizing gas or fluidizing air is introduced into the reaction chamber at such a high rate that it causes a portion of the fluidizing bed material to continuously flow together with the gas through an opening 30 disposed in the upper section of the chamber 10 into the particle separator 12.

The centrifugal separator 12 according to the FIGS. 1, 2 and 3 embodiment is a multivortex centrifugal separator, in which two parallel, vertical gas vortices separating particles from gas exhausted from the reactor chamber by means of centrifugal force are created in the gas space 31 of the separator. A vortex chamber defines the separator 12, and preferably comprises planar, mainly rectangular water tube walls 32, 34, 36 and 38. Preferably, these walls are also joined, vertical water tubes. The vortex chamber of separator 12 has one long wall, adjacent to the reaction chamber, in common with the reaction chamber, i.e., part of the wall 16 of the reaction chamber 10 constitutes the wall 32 of the vortex chamber. At the slot 30, the water tube wall 32 is bent towards the inside of the vortex chamber so that the bent parts 40 create an inlet duct 42 leading the gas flow into the vortex chamber gas space 31. The slot 30 is high and narrow, higher and narrower than in conventional vertical cyclones, preferably as high as the upper section 43 of the vortex chamber. In this design of one inlet for two vortices the height and width ratio may be lower, but preferably >3. The parts 40 bent inwardly from the wall are preferably bent to form an inlet duct tapering inwardly towards the vortex chamber.

The upper parts of the walls of the vortex chamber are preferably vertical and planar and form the upper section 43. The lower part of the long wall 36 is bent towards the opposite long wall 32 forming the lower section 45 of the vortex chamber. By this structure an asymmetrical long, funnel-shaped space 44 is formed, the bottom part of said funnel shaped space forming a solids outlet 46.

The outlet 46 also serves as an inlet into the return duct 14. The long walls of the return duct are formed by the extensions of the walls 32 and 36 of the particle separator 12. The end walls of the return duct 14 are correspondingly formed by the extensions of the walls 34 and 38. Only a portion having the width of the return duct 14, of the end walls 34 and 38 continues downwardly, thereby forming a return duct. The remaining portions of the end walls only extend to the upper part of the return duct 14, as disclosed in FIG. 1 for part of wall 34. The lower part of the return duct 14 is in communication with the lower section of the reaction chamber 10 via L-bend 48, for returning the solids separated in the separator 12 into the fluidized bed.

In the upper section 43 of the vortex chamber, two successive gas outlet ducts 54 and 56 are disposed in openings 50 and 52, for discharging purified gas from the gas space 31 of the vortex chamber. The gas outlet ducts 54, 56, i.e. so-called central ducts in the separator, may be either ceramic or cooled ducts in order to resist hot conditions in the separator. The central ducts are disposed in the gas space 31 of the vortex chamber preferably so that their center axes are on the natural center axis of the gas vortex formed by swirling gas in space 31. The gases are conducted from the separator 12 into a duct 60 disposed on top thereof, the duct 60 being provided with heat recovery surfaces 62, and further into a vertical convection section 64 disposed next to the reaction chamber 10, the convection section being also provided with heat recovery surfaces 66. The gases are discharged via duct 68.

The long walls of the vortex chamber are reinforced by means of a partition wall 70 extending from wall 32 to wall 36. The partition wall extends from below the inlet 30 to the lower section of the vortex chamber. The partition wall prevents deflections and vibrations of the long walls caused by the flowing gas. Instead of a partition wall, also wear-resistant support beams may be used for stiffening the long walls. Part 40 bent from wall 32 towards the inlet 30 stiffens the wall 32 in the upper section of the vortex chamber.

Circular elements are not provided in the vortex chamber for maintaining a circular movement of the gas in a vortex, or for guiding the solid material. Therefore, the cross section of the gas space 31 of the vortex chamber, i.e. the space filled with gas, is distinctly non-circular. The tangential feeding of the inlet gas, the location of the gas outlet, and the planar walls contribute to the forming of the gas vortex in the gas space 31. Surprisingly, it has been discovered that no cylindrical or other circular, guiding walls are needed in the gas space 31 of the separator 12 for maintaining a gas vortex. In the present specification and claims, "circularity" is the circumference of the cross section of the inner surface of the gas space 31 of the vortex chamber divided by the circumference of the biggest circle contained in the cross section; and is greater than 1, e.g. $\geq 1.1$, and preferably $\geq 1.15$, according to the invention. The walls of the vortex chamber are internally lined with a thin layer of abrasion and heat resistant refractory material, not shown in the drawings. The thickness of the refractory layer is normally about 40 to 150 mm. Preferably, the heat and abrasion resistant refractory material may be attached directly to the walls 32, 34, 36, and 38 of the vortex chamber. Places which are exposed to heavy abrasion require a thicker layer of refractory, or a more abrasion-resistant refractory may be used. Thus, for example, wall 36, opposite to the gas inlet 30, may be provided with a vertical refractory lining the length of which corresponds to the height of the inlet. At least a portion of the particles entrained in the inlet gas jet flowing into the vortex chamber then hit this refractory area on wall 36.

The particles entrained in the gas entering the separator 12 tend to flow along a straighter path than the gas. For example, when the gas flows into the vortex chamber and changes its direction of movement in order to form a vortex, some of the particles mainly continue along their straight path eventually hitting the opposite wall 36. Due to the slowness of the change of movement of the particles, the edge areas of the vortex chamber are susceptible to abrasion and preferably they have to be protected with a thicker layer of refractory or with a more resistant refractory.

With large volumes of solids flows, typical to circulating fluidized bed reactors, the abrasion caused by particles is not necessarily, however, the heaviest at the area which is opposite to the inlet. The critical areas may be on both sides of this area. The reason for this might be that the particles themselves, when flowing downwardly, form a protective barrier or a protective layer at this area. When applying a protective layer of refractory, it is advantageous to pay attention to this so that a resistant refractory is laid on this entire critical area and not only on the actual hitting point perpendicularly opposite to the gas inlet.

The corner areas of the vortex chamber have an improved impact on the separation of particles. In the corner areas the gas suspension flow is forced to change its direction abruptly. Gas changes it flow much more easily than particles, which gather in the corner areas. This leads to a decrease in particle flow velocity in the direction of the vortex flow in the corner areas. The particle flow may even stop when hitting a layer of heavier particle suspension close to the wall in the corner areas, which leads to a further concentration of particles close to the corner areas. Thus, concentrated particle suspensions/layers or other heavy particle clusters separate more easily by gravitation from the gas flow in the vortex chamber and flow downwards in the corner areas into the lower part of the separator.

The return duct 14 is also divided with a partition wall 71 into two parts 13 and 15, the lower sections of which are formed, by means of brick-lined or refractory-lined walls 72, into funnel-shaped spaces 74 and 76, into which spaces the separated solids flow. From the funnel-shaped space, the solid material is introduced via openings 78 and 80 back to the lower section of the reaction chamber.

Figure 4:
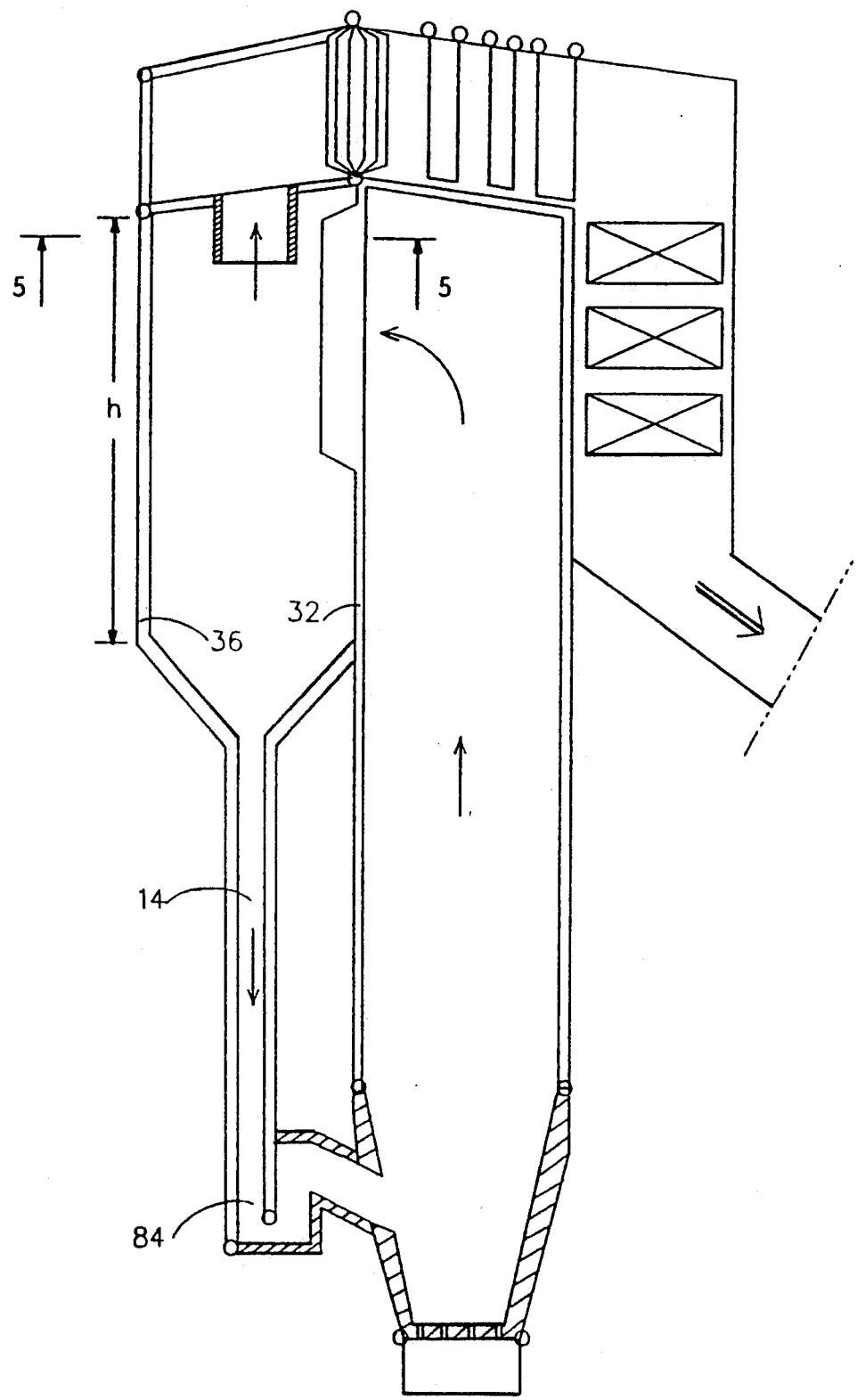
FIG. 4 is an illustration of a second centrifugal separator according to the invention disposed in a circulating fluidized bed reactor.

FIG. 1 illustrates a preferred embodiment of the invention. According to this embodiment, the wall 16 of the reaction chamber constitutes wall 32 of the return duct 14. According to a second embodiment, shown in FIG. 4, the return duct is defined by separate walls, the wall of the reaction chamber not being utilized there. In FIG. 4, respective reference numerals are used as in FIGS. 1, 2 and 3. In the lower section of the vortex chamber 12, the walls 32 and 36 are both bent towards each other so as to form a symmetric funnel in the lower section of the vortex chamber. The return duct 14 is thus disposed at a short distance from the reaction chamber. The lower part of the return duct is provided with a loop seal or knee 84, which prevents the gas from flowing from the the reaction chamber into the return duct.

In the embodiment illustrated by FIG. 4, the return duct 14 is an elongated duct as in the embodiment shown in FIG. 2. However, with partition walls, the lowest section of the vortex chamber may be so shaped as to form one or more outlets for solids at the funnel-shaped bottom of the vortex chamber, the shape of the outlets being close to a square or a circle. Thus, the outlet or outlets may be connected with tube-formed return ducts as in conventional, vertical cyclone separators.

Figure 5A:
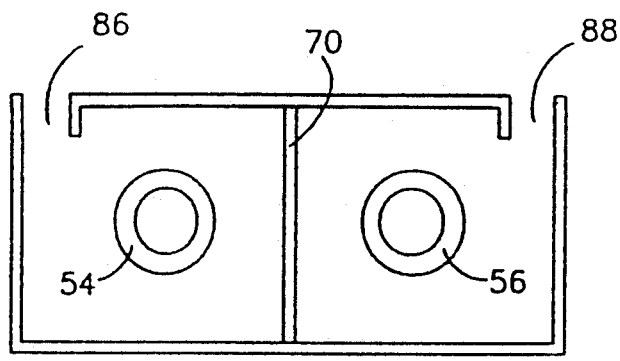
FIG. 5A is a sectional view of FIG. 4 taken along line 5—5.

FIG. 5A is a sectional view of FIG. 4 corresponding to FIG. 3 for FIG. 1. In the embodiment shown in FIGS. 1, 2 and 3, the vortex chamber 12 is provided with one gas inlet 30. The centrifugal separator according to FIG. 5A is provided with two inlets 86 and 88—one for each gas vortex. As in case of FIG. 3, the cross section of the vortex chamber 12 is also rectangular. The cross section of the gas space per vortex is almost a square. The walls of the vortex chamber are protected with a thin layer of abrasion resistant refractory material, not shown in the drawings.

Figure 6A:
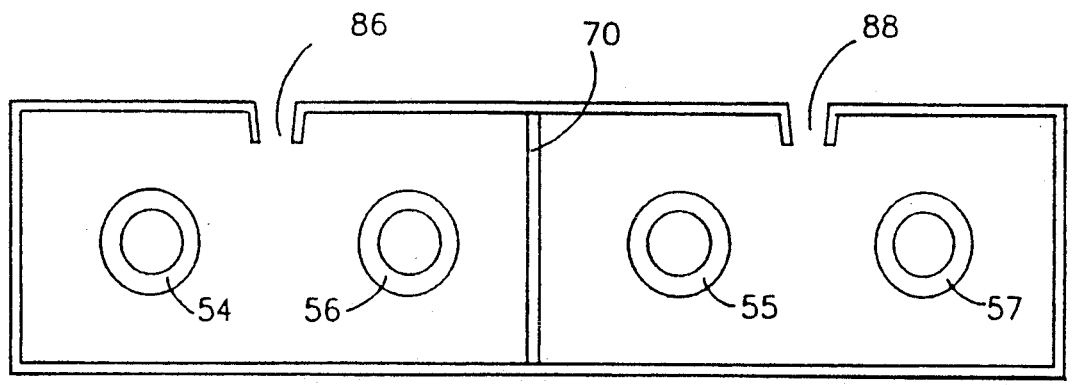
FIGS. 6A and 7A are sectional views like those of FIGS. 3 and 5A illustrating other exemplary embodiments of centrifugal separators according to the invention.

The centrifugal separator according to the invention is especially advantageous because a plurality of gas vortices may be formed in one separator enclosure. For example four vortices may be arranged in one space inside the separator, whereby each vortex is arranged with a gas outlet of its own, 54, 55, 56 and 57, as shown in FIG. 6A. Preferably, two gas inlets are disposed in the separator so that one inlet at a time feed gas into two vortices. Correspondingly, separators with still a larger number of vortices may be provided.

The gas inlets are so disposed in the separator as to feed the gas mainly tangentially towards the vortex which is to be formed. In the embodiment of the invention shown in FIG. 6A, a multivortex separator has a support wall 70 supporting the long walls of the separator. The wall divides the vortex chamber into two sections equal in size.

On the other hand, also independent separators with two vortices may simply be disposed adjacently so as to create a separator battery of four vortices. Due to planar walls, the separators are readily arranged adjacently without any need for extra space. A required amount of smaller standard size separators may be simply connected in this manner. The structure is far less expensive as standard size separator elements may be constructed and a required amount of these may be combined instead of manufacturing one single large separator.

When several planar wall elements are combined to form long separator batteries with common partition walls between different separator sections, the number of walls to be welded on site is much fewer than in manufacture of completely unconnected separators. The number of walls in a separator battery according to the invention is equal to or smaller than the number of vortices+3, when a partition wall is disposed between all vortices. The total wall area needed for the separator units is also smaller, which makes the separator less expensive. The structure of FIG. 1 is very advantageous. In this structure, the wall area of the reaction chamber is also utilized in the separator. In this case, the number of required walls are equal to or smaller than the number of vortices+2, when a partition wall is disposed between all vortices. The number of walls is still fewer if no partition walls are used.

Figure 7A:
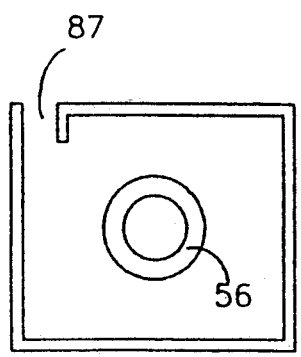

It is also possible to have only one gas vortex and one or more gas inlets in the separator according to the invention, as shown in FIG. 7A. The advantages of the invention, obtained by forming the vortex chamber of planar walls so that also the inner part of the vortex chamber substantially deviates from a circular shape, are also obtained in this case.

It is not an intention to limit the invention to the embodiments of the examples, but it can be modified and applied within the inventive scope defined in the accompanying claims. Thus, the vortex chamber may in some cases be in the shape of a polygon such as a hexagon or even an octagon, which may be simply manufactured of planar panels. The cross section of the gas space of the vortex chamber is mainly in the same shape as the cross section formed by the external walls of the vortex chamber. In the separator according to the invention, the gas space of the vortex chamber is not provided with substantially curved walls, for example, by heat-insulated refractory materials, abrasion resistant refractory materials or guide plates so that the cross section of the vortex chamber would be close to a circle. The inner walls may, however, be lined with a thin layer of abrasion resistant refractory material.

The invention also comprises a method of separating particles from a stream of high temperature gas with particles therein, using a vortex chamber with an interior gas space having a circularity of greater than 1, preferably $\geq 1.1$. The method comprises the steps of (a) introducing high temperature gas with particles entrained therein into an upper portion of the non-circular interior gas space 31 of the vortex chamber; (b) establishing at least one vertical gas vortex in the vortex chamber in which the gas swirls in the gas space, coming in contact with the non-circular cross section of the vortex chamber; (c) removing high temperature gas, from which particles have separated, from the vortex chamber; and (d) removing separated particles from a lower portion of the vortex chamber.

Figure 5B:
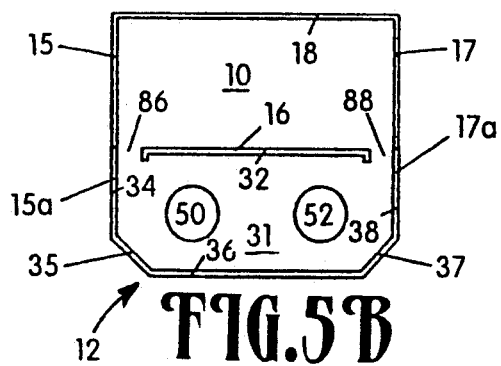

In the FIG. 5B embodiment, the vortex chamber 12 is a polygon and there is no partition wall between the gas spaces, as in the FIG. 5A embodiment. In FIG. 5B there is one inlet 86, 88 for each gas vortex formed in the vortex chamber 12 gas space 31. The reference numerals are the same in the FIGS. 5B-7B embodiments for comparable structures to those in the 5A-7A embodiments.

Figure 6B:
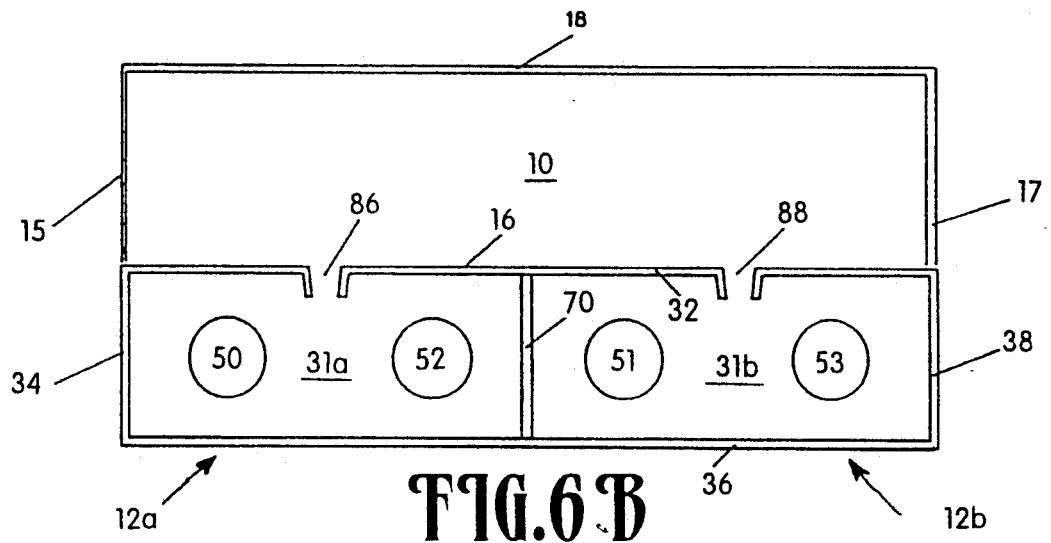
Figures 7B, 8:
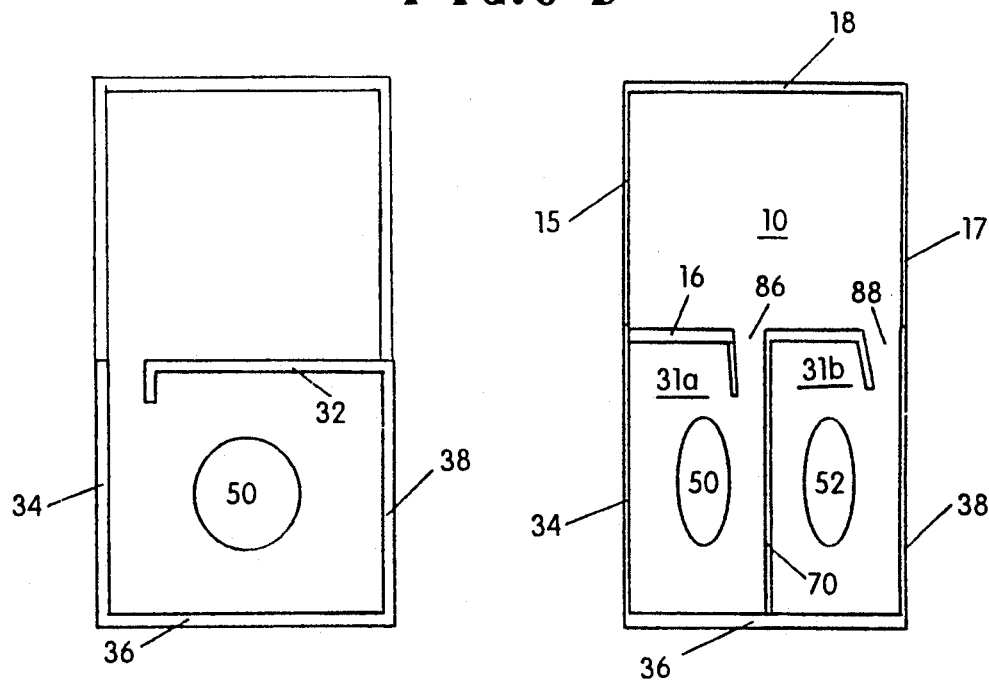

In the FIG. 6B embodiment there is one inlet 86, 88 for the gas vortices in gas spaces 31a and 31b. FIG. 7B shows a one gas vortex module.

FIG. 8 shows two gas spaces 31a and 31b with gas vortices having an elongated cross section and elongated gas outlet openings 50, 52.

Figure 9:
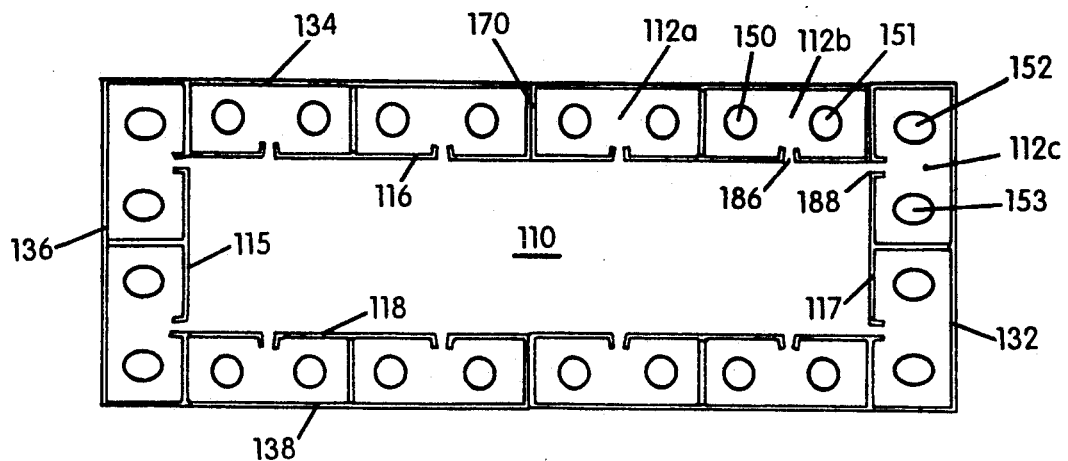
FIG. 9 is a cross-sectional view of a circulating fluidized bed reactor according to the invention with centrifugal separators disposed around the periphery thereof.

FIG. 9 shows a cross section of a circulating fluidized bed reactor having a reactor chamber 110 in the middle and separator modules 112a, 112b, 112c, etc. around the upper part of the reactor chamber 110. Structures in this embodiment comparable to those in the FIGS. 1-5A embodiments are shown by the same two digit reference numeral only preceded by a "1."

Figure 10:
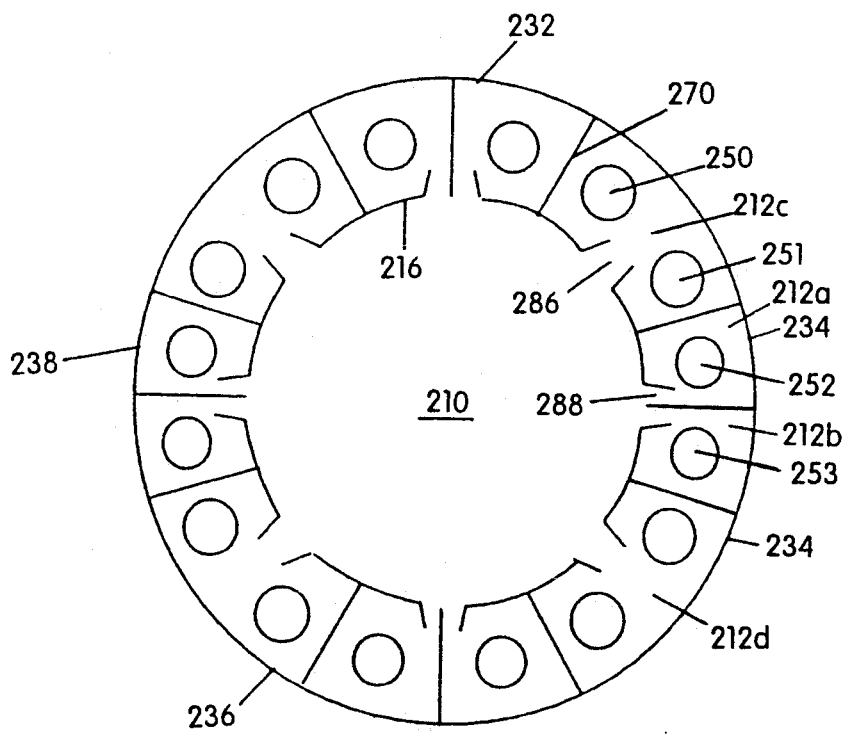
FIG. 10 is a view like that of FIG. 9 only showing a circular construction of reactor with centrifugal separators around its periphery.

FIG. 10 shows a cross section of a cylindrical reactor chamber 210 having separator modules with curved walls around the reactor chamber 210. Structures in this embodiment comparable to those in the FIGS. 1-5A embodiments are shown by the same two digit reference numeral only preceded by a "2."

Figure 11:
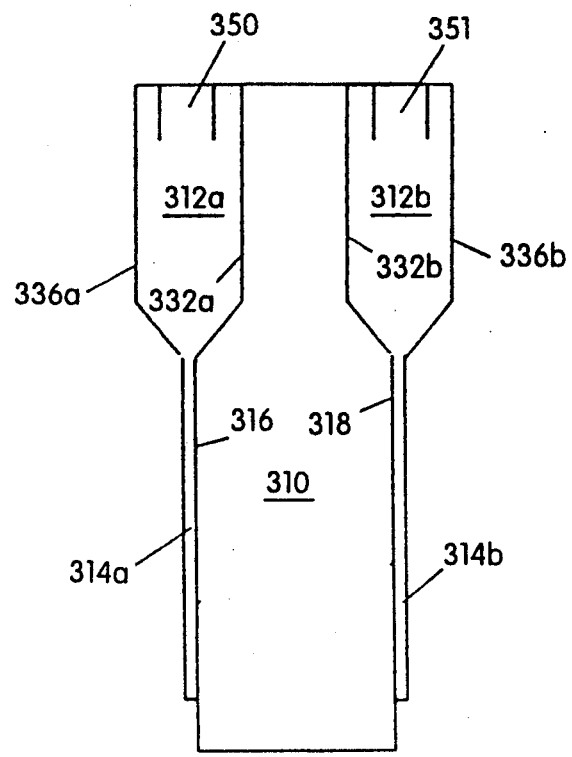
FIG. 11 is a vertical cross-sectional view of another embodiment of circulating fluidized bed reactor according to the invention with centrifugal separators associated therewith.

FIGS. 11-15 show vertical cross sections of CFB reactors having centrifugal separators according to the present invention arranged in them. In FIG. 11 separators are arranged at two opposite sides of the reactor chamber. Both long walls 331a, 332b and 336a, 336b of the separators are bent to form return ducts 314a and 314b. One of the long walls 332a and 332b are walls common with the reactor chamber. The separators thereby being arranged to partly extend into the reactor chamber. The return ducts are disposed on the outside of the reactor chamber. Structures in this embodiment comparable to those in the FIGS. 1-5A embodiments are shown by the same two digit reference numeral only preceded by a "3."

Figure 12:
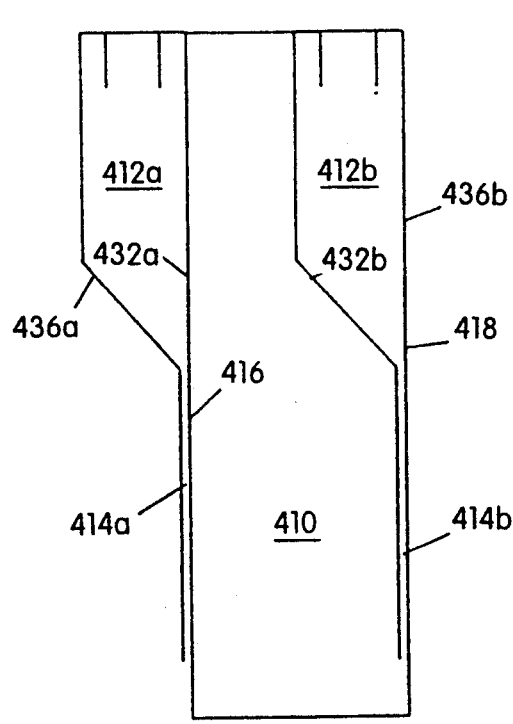
FIG. 12 through 15 are vertical cross-sectional views like that of FIG. 11 only for different embodiments of circulating fluidized bed reactors.

In the embodiment depicted in FIG. 12 only one (412b) of the centrifugal separators has a long bent wall 432b common with the reactor chamber 410 and thereby only this separator 412b protrudes in to the reactor chamber. The return duct 424b of separator 412b is arranged inside the reactor chamber. The return duct 414a of the other separator is outside the reactor chamber. Structures in this embodiment comparable to those in the FIGS. 1-5A embodiments are shown by the same two digit reference numeral only preceded by a "4."

Figure 13:
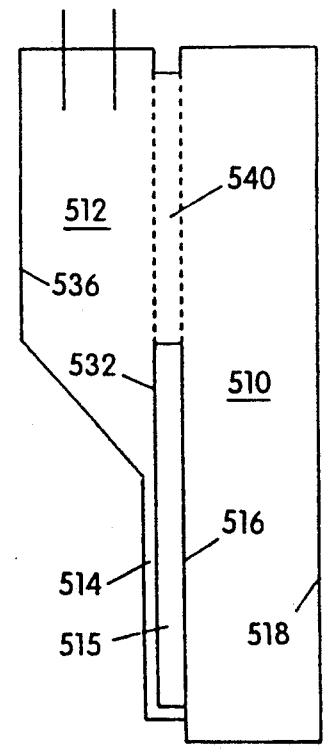

In the embodiment shown in FIG. 13 the separator does not have any common walls with the reactor chamber. The separator is connected through duct 540 with the reactor chamber 510. Structures in this embodiment comparable to those in the FIGS. 1-5A embodiments are shown by the same two digit reference numeral only preceded by a "5."

Figure 14:
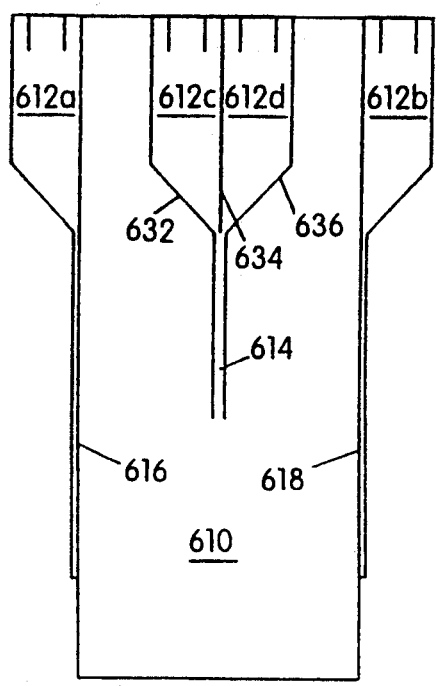

FIG. 14 depicts an embodiment having two separators 612c, 612d entirely inside the reactor chamber 610, without any common walls with the reactor chamber. The corresponding return ducts 614 form a partition inside the reactor chamber 610. Structures in this embodiment comparable to those in the FIGS. 1-5A embodiments are shown by the same two digit reference numeral only preceded by a "6."

Figure 15:
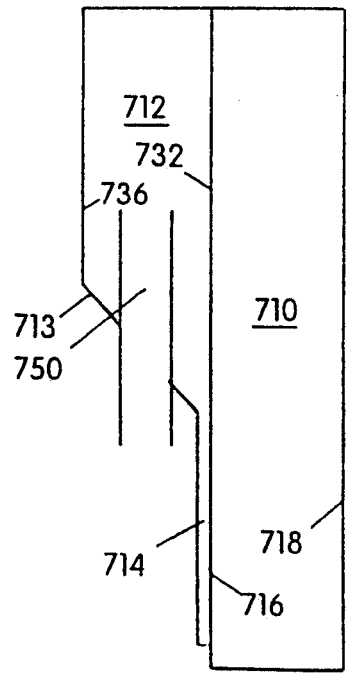

FIG. 15 shows a centrifugal separator 712 according to the present invention, of the flow through type, having a gas outlet 750 in the bottom part of the vortex chamber 712. Structures in this embodiment comparable to those in the FIGS. 1-5A embodiments are shown by the same two digit reference numeral only preceded by a "7."

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A centrifugal separator for separating particles from gases, consisting essentially of a vertical vortex chamber which has walls defining an interior gas space, an upper section, and a lower section, the gas space having a cross section;

at least one inlet for particle laden gases to be purified, disposed in the upper section of said vortex chamber;

at least one purified gas outlet from said vortex chamber;

at least one outlet for separated particles, disposed in the lower section of said vortex chamber; said at least one inlet, at least one outlet, and vortex chamber defining a plurality of vertical gas vortices in said vortex chamber; and said vortex chamber walls being defined by substantially planar walls, and being distinctly non-cylindrical, and the cross section of said gas space being substantially quadrate.

2. A centrifugal separator as recited in claim 1, wherein said vortex chamber is provided with one gas inlet per two gas outlets and wherein two gas vortices, each gas vortex having its own associated outlet, is provided for each gas inlet.

3. A centrifugal separator as recited in claim 1, wherein a partition wall extending from one long side wall of the vortex chamber to the other is disposed between at least two gas vortices in the vortex chamber, said partition wall serving as a support element for the long side walls.

4. A centrifugal separator for separating particles from gases, comprising a vertical vortex chamber which has walls defining an interior gas space, an upper section, and a lower section, said gas space having a cross section;
   at least one inlet for gases to be purified, disposed in the upper section of the vortex chamber;
   at least one outlet for the purified gases, from the vortex chamber;
   at least one outlet for the separated particles, disposed in the lower section of the vortex chamber; said inlet, outlets and vortex chamber defining at least one vertical gas vortex in the vortex chamber;
   said vortex chamber walls being distinctly non-cylindrical, and the cross section of said gas space being distinctly non-circular, having a circularity greater than 1; and
   wherein at least two opposite side walls of the upper section of the vortex chamber are formed by fluid circulating cooling surfaces.

5. A centrifugal separator as recited in claim 4, wherein all side walls of the vortex chamber are formed by fluid circulating cooling surfaces.

6. A centrifugal separator as recited in claim 4, wherein the cross section of the gas space defined by the side walls of said vortex chamber is in the shape of a rectangle having long side walls two or more times the length of short side walls; and wherein two or more gas vortices are created in said vortex chamber.

7. A centrifugal separator as recited in claim 4, where the gas space is defined by inner surfaces, and wherein the inner surfaces defining the gas space of the vortex chamber are lined with a thin layer of abrasion resistant refractory material.

8. A centrifugal separator for separating particles from gases, comprising a vertical vortex chamber which has walls defining an interior gas space, an upper section, and a lower section, said gas space having a cross section;
   at least one inlet for gases to be purified, disposed in the upper section of the vortex chamber;
   at least one outlet for the purified gases, from the vortex chamber;
   at least one outlet for the separated particles, disposed in the lower section of the vortex chamber; said inlet, outlets and vortex chamber defining at least one vertical gas vortex in the vortex chamber;
   said vortex chamber walls being substantially planar and the cross section of said gas space being distinctly non-circular, having a circularity greater than 1; and
   wherein the gas inlet or inlets are in the shape of vertical narrow slots.

9. A centrifugal separator as recited in claim 8, wherein the upper section of the vortex chamber has a height, and wherein the slot or slots are approximately of the same height as the upper section of the vortex chamber.

10. A centrifugal separator as recited in claim 8, wherein the cross section of the gas space in the upper section of the vortex chamber is substantially constant at different elevations.

11. A centrifugal separator as recited in claim 8, wherein the cross-sectional area of the gas space in the lower section of the vortex chamber is downwardly decreasing.

12. A centrifugal separator as recited in claim 11, wherein at least one wall in the lower section of the vortex chamber is inclined to as to reduce the gas space in the downwardly direction.

13. A centrifugal separator as recited in claim 12, wherein two opposite walls in the lower section of the vortex chamber approach each other in the downward direction so that the lower section forms a slot.

14. A centrifugal separator as recited in claim 12, wherein one wall in the lower section of the vortex chamber approaches the opposite wall so that a slot is formed in the lower section.

15. A centrifugal separator as recited in claim 11, wherein the at least one outlet for separated particles has a size, and wherein one or more walls in the lower section of the vortex chamber approach each other in such a manner that, in the lower section of the vortex chamber is formed a slot or channel of substantially the size of the outlet for the separated particles.

16. A centrifugal separator for separating particles from gases, comprising a vertical vortex chamber which has walls defining an interior gas space, an upper section, and a lower section, the gas space having a cross section;
   at least one inlet for gases to be purified, disposed in the upper section of the vortex chamber;
   at least one outlet for the purified gases, from the vortex chamber;
   at least one outlet for the separated particles, disposed in the lower section of the vortex chamber; said inlet, outlets and vortex chamber defining at least one vertical gas vortex in the vortex chamber;
   said vortex chamber walls being distinctly non-cylindrical, and the cross section of said gas space being distinctly non-circular, having a circularity greater than 1; and
   wherein the outlet or outlets for the separated particles are not on the same symmetrical vertical axis as the outlet or outlets for the purified gases, said outlet or outlets for said purified gases being vertical and centrally disposed with respect to a gas vortex or vortices in said vortex chamber.

17. A centrifugal separator for separating particles from gases, comprising a vertical vortex chamber which has walls defining an interior gas space, an upper section, and a lower section, said gas space having a cross section;
   at least one inlet for particle laden gases to be purified, disposed in the upper section of the vortex chamber;
   at least one outlet for the purified gases, from the vortex chamber;

at least one outlet for the separated particles, disposed in the lower section of the vortex chamber; said inlet, outlets and vortex chamber defining at least one vertical ga vortex in the vortex chamber;

said vortex chamber walls being distinctly non-cylindrical, and the cross section of said gas space being distinctly non-circular, having a circularity greater than 1; and wherein the centrifugal separator comprises at least two adjacently disposed vortex chambers, one wall of each of said vortex chambers being formed by a single tube panel connecting the vortex chambers, and two adjacent vortex chambers having one common gas inlet.

18. A centrifugal separator as recited in claim 17, wherein the centrifugal separator comprises of at least two adjacently disposed vortex chambers, two opposite walls of said vortex chambers being formed of two tube panels connecting the vortex chambers.

19. A centrifugal separator as recited in claim 17, wherein two adjacent vortex chambers have one common wall.

20. A centrifugal separator as recited in claim 17 wherein aid tube panel has a first portion which forms a wall in a first vortex chamber, and a second portion which forms a wall in a second vortex chamber adjacent to said first vortex chamber.

21. A circulating fluidized bed reactor, comprising:

a reactor chamber, restricted horizontally mainly by vertical planar or curved walls or by cylindrical walls;

means for introducing fluidizing gas into the reactor chamber;

a duct for feeding fuel or other solid material into the reactor chamber;

a centrifugal separator connected to the reactor chamber, said separator comprising a vortex chamber, for separating solid particles from gases discharged from the reactor chamber;

a return duct for recirculating separated solid particles from the separator into the reactor chamber;

a gas outlet for discharging gas from the separator; and said centrifugal separator comprising a vertical vortex chamber which has walls defining an interior gas space, said vortex chamber walls being distinctly non-cylindrical, and said gas space having a cross section that is distinctly non-circular, having a circularity greater than 1.

22. A circulating fluidized bed reactor as recited in claim 21 wherein the circularity of the cross section of the gas space of the vortex chamber is greater than or equal to 1.1.

23. A circulating fluidized bed reactor as recited in claim 21 wherein the circularity of the cross section of the gas space of the vortex chamber is greater than or equal to 1.15.

24. A circulating fluidized bed reactor as recited in claim 21 wherein said gas space has a substantially quadrate cross section.

* * * * *